United States Patent
Allain

[11] Patent Number: 5,762,547
[45] Date of Patent: Jun. 9, 1998

[54] APPARATUS FOR PROCESSING SHRIMP

[76] Inventor: Reid P. Allain, 1567 Cook's Pond Dr., Powder Springs, Ga. 30073

[21] Appl. No.: 758,998

[22] Filed: Dec. 2, 1996

[51] Int. Cl.$^6$ .................................................. A22C 29/02
[52] U.S. Cl. ........................................... 452/179; 452/179
[58] Field of Search ....................... 452/2, 179, 182

[56] References Cited

U.S. PATENT DOCUMENTS

| | | |
|---|---|---|
| 1,677,579 | 7/1928 | Barry . |
| 2,781,544 | 2/1957 | Skrmetta . |
| 2,818,598 | 1/1958 | Skrmetta . |
| 2,976,564 | 3/1961 | Skrmetta . |
| 3,024,490 | 3/1962 | Skrmetta . |
| 3,031,714 | 5/1962 | Skrmetta et al. . |
| 3,070,833 | 1/1963 | Skrmetta . |
| 3,383,734 | 5/1968 | Lapeyre . |
| 3,414,934 | 12/1968 | Skrmetta et al. . |
| 3,696,466 | 10/1972 | Letchworth . |
| 3,784,007 | 1/1974 | Skrmetta ............... 209/85 |
| 3,816,877 | 6/1974 | Bullock . |
| 3,897,610 | 8/1975 | Lapeyre . |
| 3,932,914 | 1/1976 | Lapeyre . |
| 4,016,625 | 4/1977 | Mitchell . |
| 4,399,588 | 8/1983 | Molnar .................. 452/179 |
| 4,531,261 | 7/1985 | Sanaka . |
| 4,692,965 | 9/1987 | Stephenson . |
| 4,934,028 | 6/1990 | Stipe ...................... 452/179 |
| 4,941,233 | 7/1990 | Allain . |

FOREIGN PATENT DOCUMENTS

| | | |
|---|---|---|
| 3535035 | 4/1986 | Germany . |

*Primary Examiner*—Willis Little
*Attorney, Agent, or Firm*—Kennedy, Davis & Kennedy

[57] ABSTRACT

A shrimp orienting and deheading apparatus (10) includes a top track (11), a middle track (12), a bottom track (13) and a deheading station (14). The top track has a V-shaped channel (16) with a step (18) which causes a shrimp (S) positioned tail forward and dorsal side down to rotate to a head forward dorsal side up position as they fall to the underlying middle track. The middle track is separated from the bottom track by a gap (21). Shrimp entering the gap in a tail forward dorsal side up position fall into the gap while shrimp in all other positions bridge the gap. The deheading station has a pair of severing fingers (55) with a vertical blade (62) and two horizontal blades (63, 64).

24 Claims, 5 Drawing Sheets

APPARATUS FOR PROCESSING SHRIMP

TECHNICAL FIELD

This invention relates to apparatuses for processing crustaceans, and more particularly to apparatuses for positioning and deheading shrimp on an automated basis.

BACKGROUND OF THE INVENTION

Once shrimp are caught and removed from water they must be deheaded within a relatively short period of time or frozen whole to delay the decaying action of bacteria within the head. Heretofore, shrimp have been deheaded by manually pulling the head from the body of the shrimp. This process however is labor intensive and time consuming.

Automated apparatuses have been designed for deheading shrimp as shown in U.S. Pat. No. 4,692,965. These apparatuses dehead shrimp by bending the shrimp quickly around an edge as they move from a vertical tube of slow moving fluid to a horizontal tube of fast moving fluid. However, because the orientation of the shrimp is not consistent, as well as other variables involving the force required to dehead shrimp, these apparatuses do not always dehead the shrimp. Furthermore, the separated heads and bodies of the shrimp are conveyed within the same stream of fluid, thus requiring further separation of these portions.

Shrimp deheading apparatuses have also been designed which have a blade which severs the head from the body, as shown in U.S. Pat. No. 4,016,625. However, due to differences in the size of shrimp these apparatuses sometimes sever within the head thus causing portions of the head to remain attached to the body. Conversely, the shrimp are sometimes severed within the body thus causing a portion of the body meat of the shrimp to remain attached to the head and therefore wasted. Also, even when a shrimp is severed between the head plate and the first thoracic plate, a portion of the body meat which extends beneath the head plate is severed from the body and discarded with the head, thereby causing inefficiencies and increases in the overall cost of processed shrimp. Another problem associated with these types of deheading apparatuses is that the shrimp must be oriented properly with the head in a particular position prior to the blade contacting the shrimp. This problem has proved to be difficult to solve on an automated basis and thus has been accomplished manually.

Shrimp deheading apparatuses have also been designed which remove the head by "pinching" it from the body, as shown in U.S. Pat. No. 4,941,233. A problem however occurs with the proper positioning of the shrimp immediately prior to the pinching action. Oftentimes, differences in the natural curvature of shrimp causes shrimp to be oriented at different angles as they are pinched between a deheading finger and a deheading block. It has been found that a consistent orientation of the shrimp is an important factor in properly removing the head.

Accordingly, it is seen that a need has long existed for apparatuses for positioning and deheading shrimp in a commercially efficient and effective manner. It is to the provision of such apparatuses therefore that the present invention is primarily directed.

SUMMARY OF THE INVENTION

In a preferred form of the invention an apparatus is disclosed for reorienting shrimp having a head, a tail, a body extending between the head and the tail, an anterior side, and a dorsal side, entering the apparatus in a tail forward orientation to a head forward orientation and maintaining the orientation of shrimp entering the apparatus in a head forward direction. The apparatus comprises a trough having two opposite, inwardly facing shrimp supporting surfaces sloping downwardly towards each other. The two supporting surfaces have a first longitudinal portion spaced a selected distance from each other to support the head and a majority of the body of shrimp thereon, a second longitudinal portion spaced a second selected distance from each other greater than the first selected distance between the first longitudinal portions to allow the passage of shrimp tails therebetween while supporting the shrimp head thereon, and a third longitudinal portion spaced a third selected distance from each other greater than the second selected distance between the second longitudinal portions and having an open bottom to allow the passage of the shrimp head therebetween. The first and second portions are joined together at a junction defined by a bottom edge extending generally lateral to the longitudinal first and second portions. The apparatus also has reciprocating means for reciprocating the trough in a longitudinal direction to cause movement of shrimp along the trough in the longitudinal direction, and means for catching and advancing shrimp in a head forward orientation mounted directly below the third longitudinal portion. With this construction, as shrimp positioned upon the trough with their tails forward in the direction of shrimp movement towards the junction bottom edge and the dorsal side of the shrimp facing downwards move onto the second portion their tails drop below the second portion with their heads still supported upon the first portion, thereby rotating the shrimp to a generally head forward position so as to substantially reverse the orientation of the shrimp, and upon further movement the shrimp fall from the trough onto the catching and advancing means.

DETAILED DESCRIPTION

Figures 3, 5, 10:
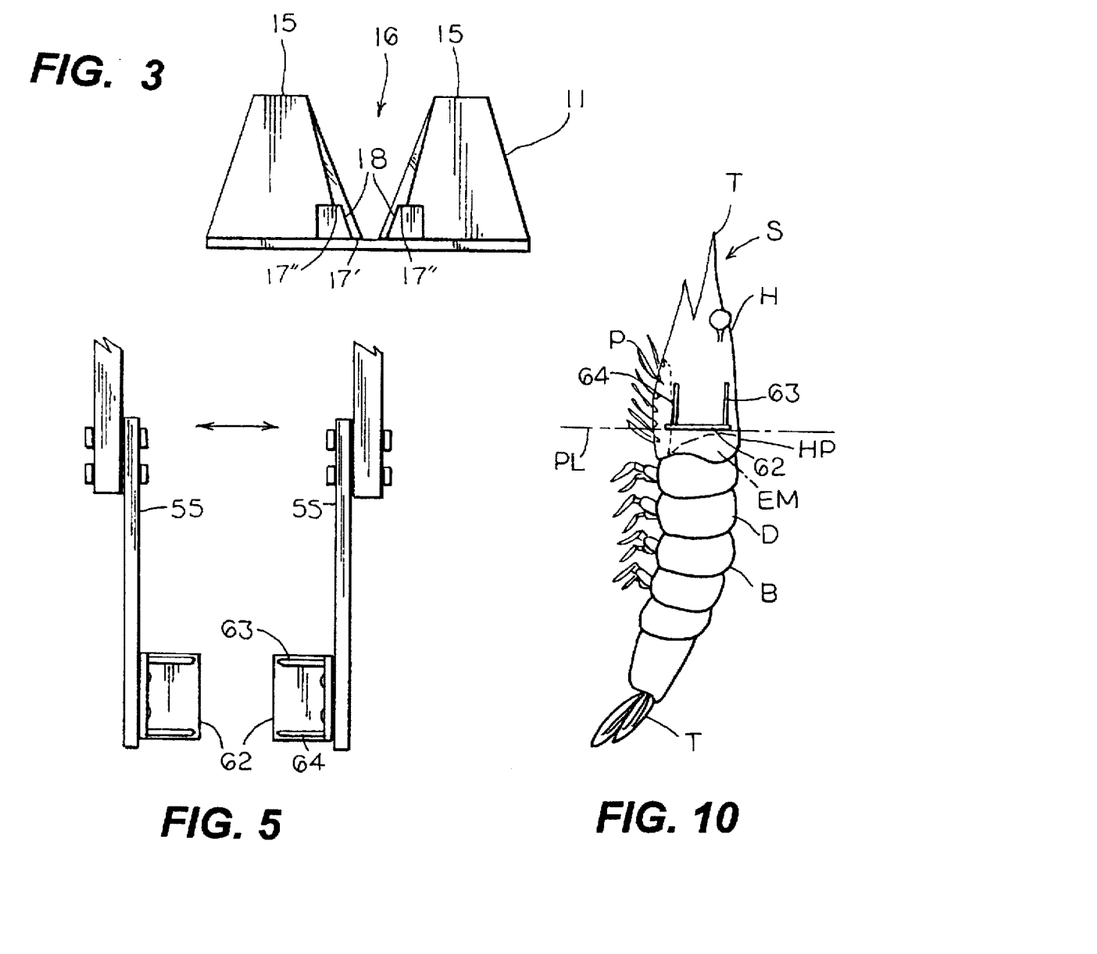
FIG. 3 is an end view of the top track of the apparatus of FIG. 1.
FIG. 5 is an end view of the severing fingers of the apparatus of FIG. 1.
FIG. 10 is a side view of a shrimp indicating the element thereof and the positioning of the deheading blades against the shrimp.

With reference next to the drawing, there is shown an apparatus 10 which orient shrimp S, having a head H, a tail T, a body B extending between the head and tail, and separates their heads H from their bodies B in a manner so as to capture the extra meat EM extending beneath the head plate HP of the shrimp head.

Figure 1:
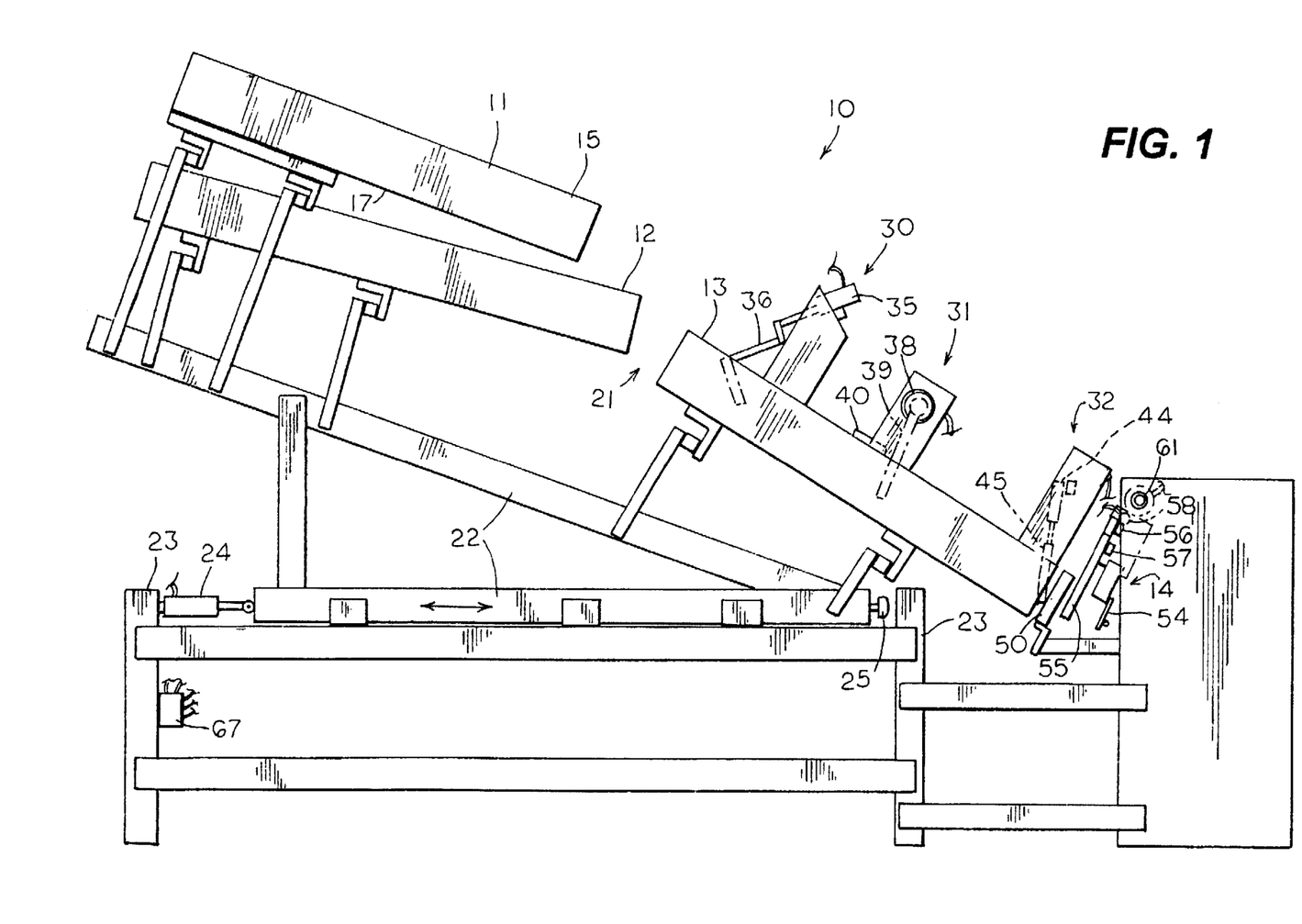
FIG. 1 is a side view of the shrimp orienting and deheading apparatus embodying principles of the invention in a preferred form.
Figure 2:
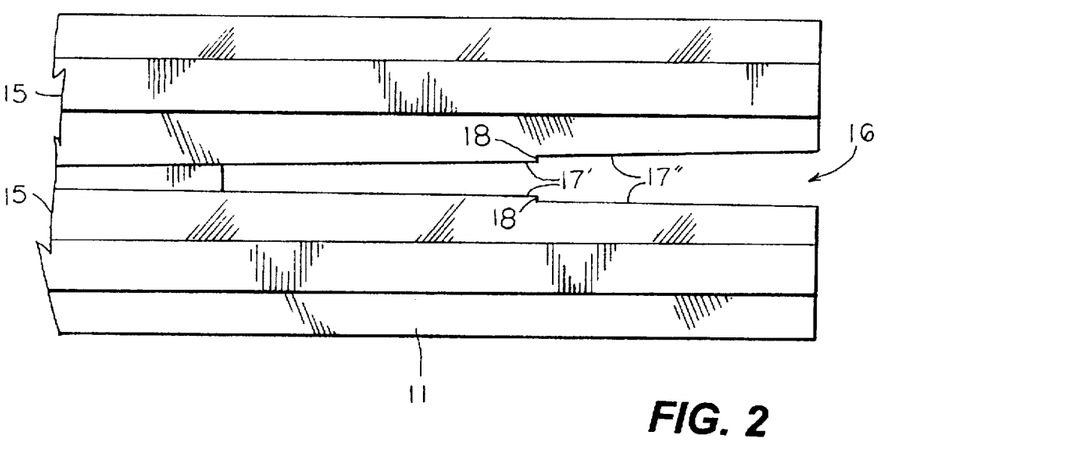
FIG. 2 is a top view of a top track of the apparatus of FIG. 1.

The deheading apparatus 10 has a top track 11, a middle track 12, a bottom track 13 and a deheading station 14. The top track 11, middle track 12 and bottom track 13 have multiple pairs of inverted V-shaped rails or troughs 15 defining V-shaped channels 16 therebetween. The top track rails have a first portion with a longitudinal lower edge 17', a second portion with aa longitudinal lower edge 17", and a step 18 extending laterally between lower edges 17' and 17". Step 18 may be formed by undercutting each rail so that lower edge 17" is elevated above lower edge 17". The portion of the top track rails commencing just prior to step 18 and the middle track rails are separated so that their channels 16 extend completely through the track to allow at least a portion of the shrimp to extend therethrough. The rails of the bottom track are bridged by a floor 20. The ends of the middle track and the bottom track are separated by a gap 21 measuring approximately 1 ¼ inches.

The top, middle and bottom tracks are mounted to a moveable inner frame 22 which is coupled to a stationary outer frame 23. A pneumatic cylinder 24 is mounted between the inner frame 22 and the outer frame 23 for reciprocal movement of the inner frame back and forth in the longitudinal direction of the tracks. A resilient stop 25 is mounted to the outer frame 23 a selected distance from the inner frame 22 to cause the abrupt halt of the inner frame as it reciprocates towards the deheading station and initiate an immediate return stroke of the frame away from the deheading station. The reciprocal movement and abrupt halt of the tracks cause shrimp thereon to move down the tracks towards the deheading station. The construction and design of the tracks, inner frame, outer frame, and the means for reciprocal movement of the inner frame are described in detail in U.S. Pat. Nos. 4,916,776 and 5,405,287, which are specifically incorporated herein.

Figure 4:
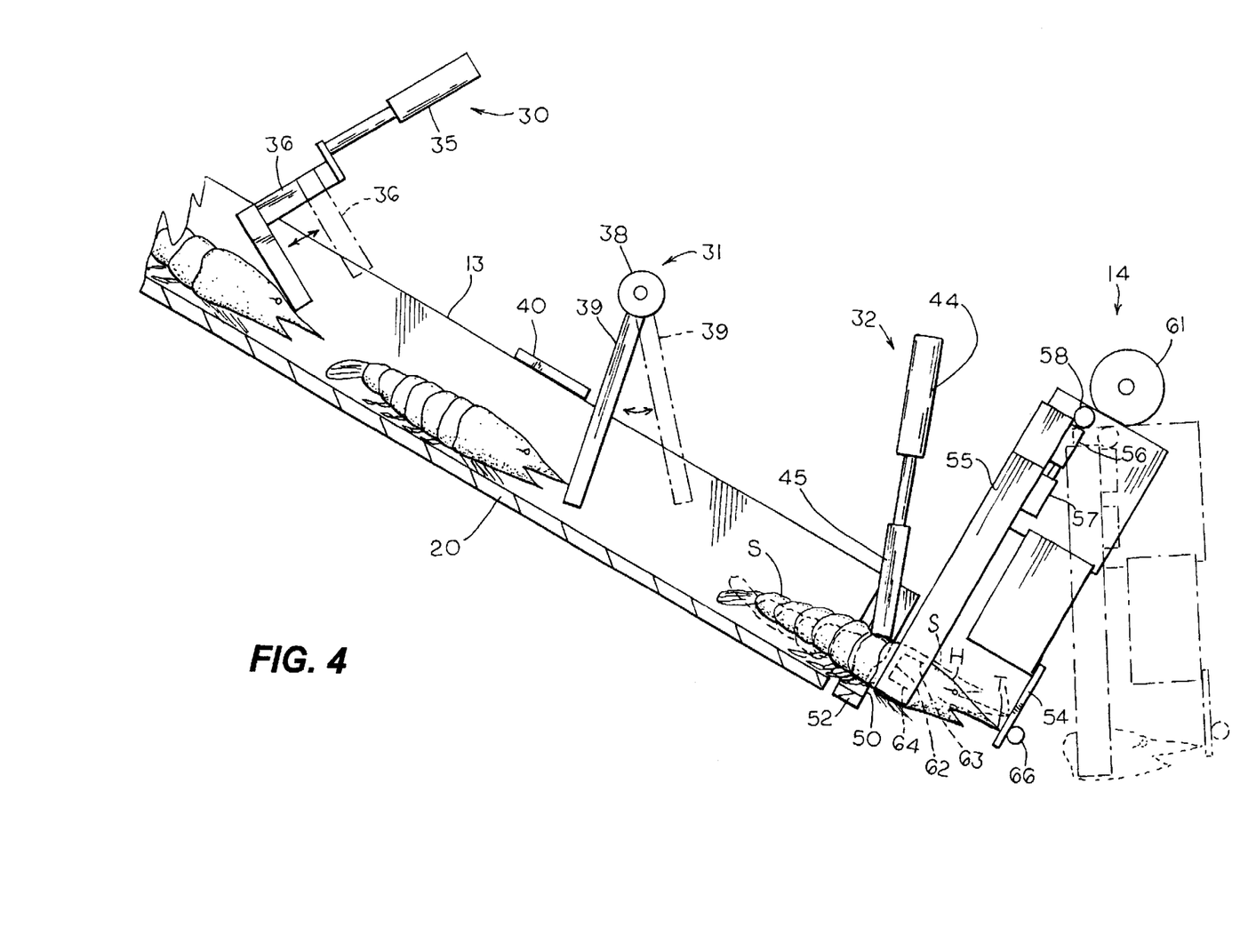
FIG. 4 is a side view of a bottom track and deheading station of the apparatus of FIG. 1.

Referring next to FIG. 4, a first stopping station 30, a second stopping station 31 and a third stopping station 32 are mounted to the bottom track. The first stopping station 30 has a pneumatic cylinder 35 coupled to an L-shaped finger 36. Pneumatic cylinder 35 reciprocally moves finger 36 into the V-shaped channel in a direction generally perpendicular to the track. The second stopping station 31 has a pneumatic cylinder 38 coupled to a finger 39. Pneumatic cylinder 38 reciprocally pivots the finger 39 into the V-shaped channel. A plate 40 is mounted to the top of the rails of the bottom track adjacent finger 39. The third stopping station 32 has a pneumatic cylinder 44 coupled to a finger 45. Pneumatic cylinder 44 reciprocally moves finger 45 into the V-shaped channel adjacent the exit end thereof in a direction generally perpendicular to the track.

The deheading station 14 has two rails 50 aligned with the rails of the bottom track. Here again, the rails define a V-shaped channel 51 and have a bottom floor 52. The deheading station also has a stop bar 54 and multiple pairs of elongated severing fingers 55. One severing finger 55 of each pair of fingers is mounted at one end to an actuation bar 56 with the other severing finger 55 mounted at one end to another actuation bar 57. A pneumatic cylinder 58 is coupled to the actuation bars 56 and 57 so as to move them in opposite directions, as indicated by the arrows in FIG. 5, to bring the fingers 55 towards and away from each other. Each severing finger 55 has a vertical blade 62, a top horizontal blade 63 and a bottom horizontal blade 64. A pneumatic cylinder 61 is coupled to the stop bar 54 and finger actuation bars 56 and 57 for reciprocal, pivotal movement thereof between a severing position adjacent the bottom track and a releasing position distal the bottom track. With the severing fingers 55 in their severing positions, the vertical blades 62 of corresponding severing fingers overlap each other by approximately ⅛ inch and the horizontal blades 63 and 64 of corresponding fingers are separated from each other by approximately 1/16 inch. A nozzle 66 coupled to an unshown water supply is positioned to direct a stream of water between the severing fingers in their releasing position. A controller 67 coordinates the actuation of the pneumatic cylinder 35, 38, 44, 58 and 61 through control of air pressure directed to these pneumatic cylinders.

Figures 6, 7:
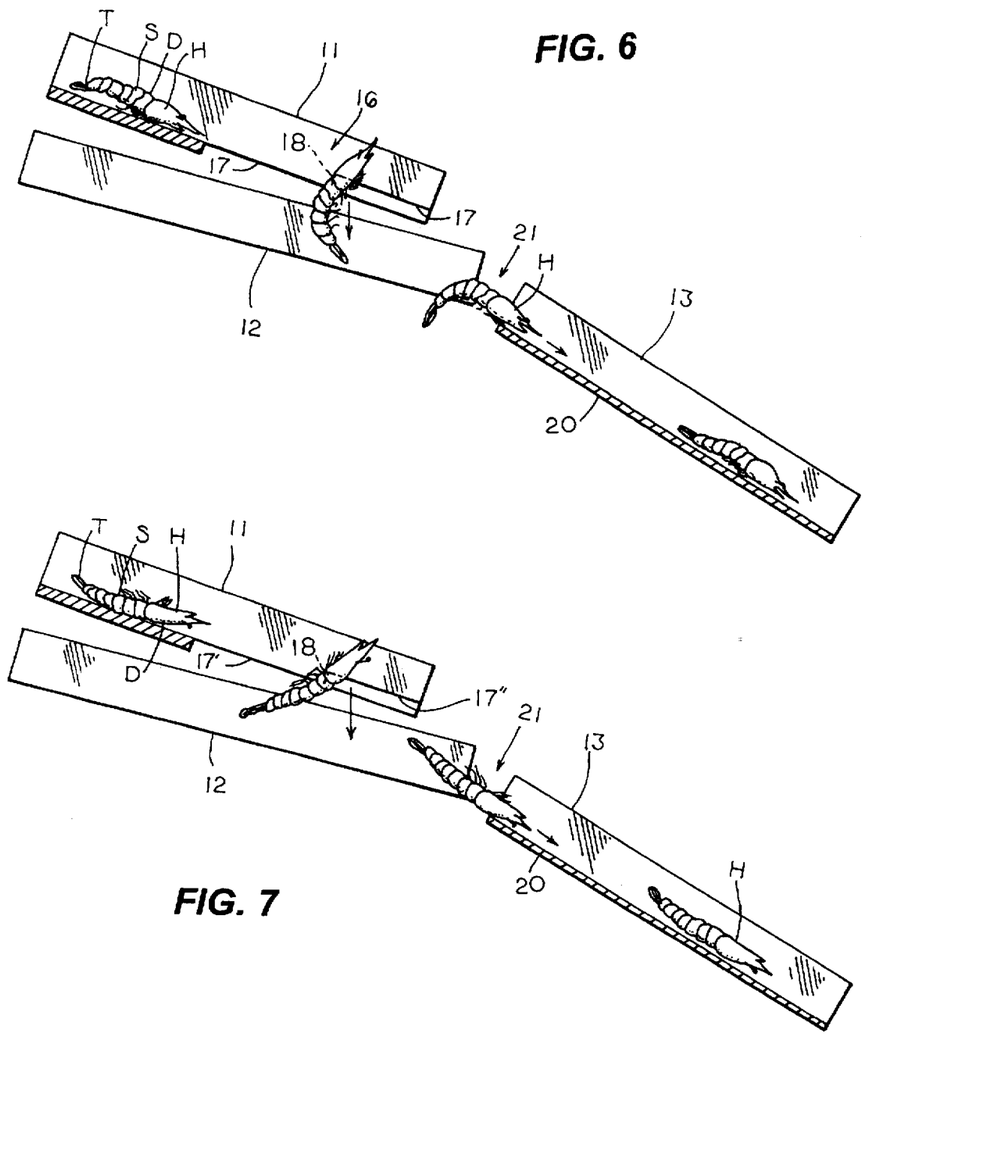
FIG. 6 is a side view of the tracks of the apparatus of FIG. 1, showing the sequential processing of a shrimp oriented in a head forward dorsal side up orientation.
FIG. 7 is a side view of the tracks of the apparatus of FIG. 1, showing the sequential processing of a shrimp oriented in a head forward dorsal side down orientation.

In use, tracks 11, 12 and 13 are designed to re-orient shrimp entering the apparatus in four possible initial positions (head H forward dorsal side D up, head H forward dorsal side D down, tail T forward dorsal side D up, and tail T forward dorsal side D down) to two possible end positions for deheading (head forward dorsal side up and head forward dorsal side down). Referring to FIG. 6, there is shown shrimp commencing upon the top track 11 in a head forward dorsal side D up position. Through reciprocal movement of the inner frame the shrimp travels down the top track 11 with the head H and a majority of the body B supported upon the rails until the shrimp reaches step 18 wherein the shrimp tails T and body B fall between the rails of the top track as they pass over the step and onto the second portion of the V-shaped channel defined by lower edges 17". With continued forward movement of the shrimp the head H is momentarily supported upon the rails adjacent step 18 prior to being thrust forward by the longitudinal movement of the track to a portion of the tracks having a spacing therebetween insufficient to support the shrimp thereon. As such, the shrimp fall between the rails and onto the rails of the middle track 12. The forward thrust upon the upright head end of the shrimp insures that the shrimp is rotated forward as it falls between the rails of the top track. With small shrimp it is believed that the rails immediately following the step may be insufficient to support even the shrimp head or may do so only to the slightest degree. In this situation, it is believed that the step 18 contacts and pushes the shrimp forward as it falls between the rails, thereby causing the shrimp to rotate forward to a head forward position upon the middle track. The shrimp then travel along the middle track to the end thereof where their heads H then bridge gap 21 and continue onto the bottom rail 13. The shrimp S then travel the length of the bottom rail, as described in more detail hereinafter, to the deheading station wherein the tips T of the shrimp heads abut the stop bar 54 with the majority of the shrimp body resting upon the rails of the bottom track, as shown in FIG. 4.

Referring to FIG. 7 there is shown a shrimp commencing upon the top track 11 in a head H forward dorsal side D down position. Again, the shrimp moves to the step 18 where it drops onto the middle track and bridges gap 21 so as to be transferred to the bottom track. The shrimp then moves along the bottom track to the deheading station with their head tip T abutting the stop bar, as shown with the shrimp in phantom lines in FIG. 4.

Figure 8:
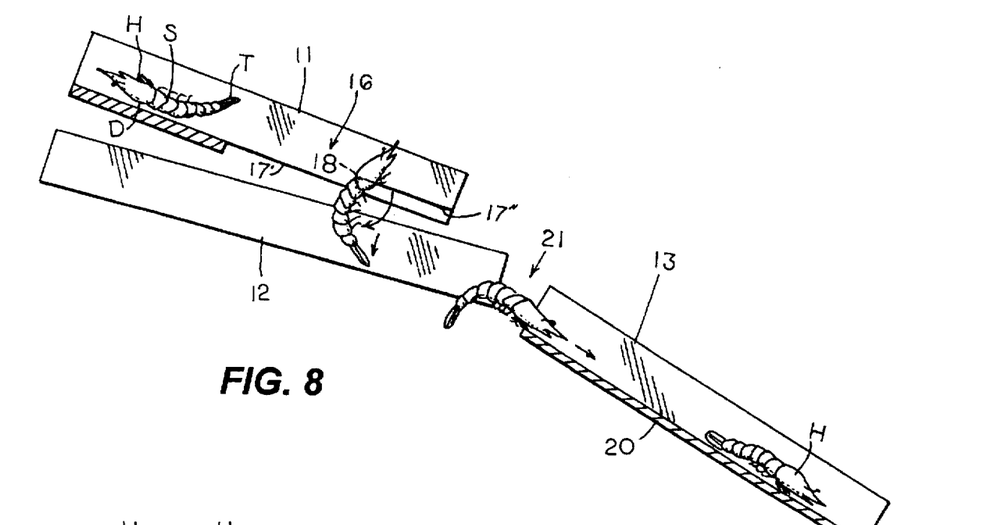
FIG. 8 is a side view of the tracks of the apparatus of FIG. 1, showing the sequential processing of a shrimp oriented in a tail forward dorsal side down orientation.

Referring to FIG. 8, there is shown a shrimp commencing upon the top track 11 in a tail T forward, dorsal side D down position. As the shrimp reaches step 18 the widening of the track (through the configuration of the step) causes the shrimp tail T to rotate clockwise downward with the shrimp head H still supported upon the top track second portion. With continued forward movement of the shrimp it drops from the top track with a forward rotation so as to cause the shrimp to fall upon the middle track with the shrimp in a head forward dorsal side up position. The shrimp then bridges the gap and continues onto the bottom rail to the deheading station.

Figure 9:
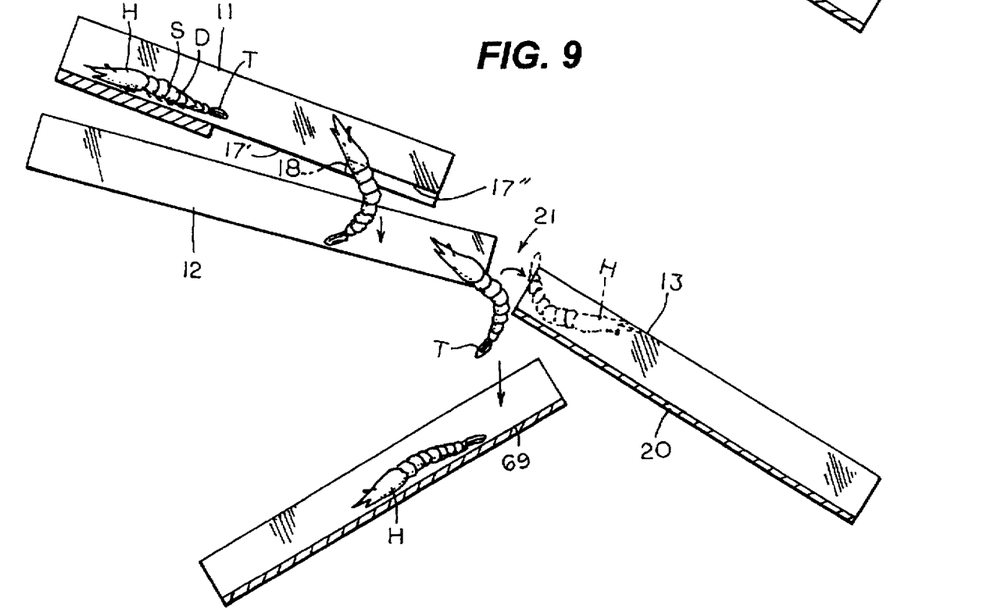
FIG. 9 is a side view of the tracks of the apparatus of FIG. 1, showing the sequential processing of a shrimp oriented in a tail forward dorsal side up orientation.

Referring to FIG. 9, there is shown a shrimp commencing upon the top track in a tail T forward dorsal side D up position. Here, the shrimp moves to the step 18 where it then drops from the top track onto the middle track where it then travels to the end thereof. Here, however, the head H does not bridge gap 21, but instead the tail T drops within the gap 21 thereby causing the shrimp S to fall between the middle track and the bottom track. The shrimp may then fall to an unshown transport system for reloading the shrimp onto the top rail or the shrimp may fall in a head forward orientation onto an alternative track 69, shown in phantom lines, which is constructed similarly to the bottom track but oriented in an opposite direction so that the shrimp reaches a similar deheading station. A very large shrimp may alternatively rotate onto the bottom track with its dorsal side down. Here, the shrimp continues along the bottom track in a head forward dorsal side down position to the deheading station.

Referring next to FIG. 4, with the apparatus having multiple rails the shrimp must reach the deheading station 14 simultaneously to optimize production. To accomplish this the first stopping station finger 36 is extended into the V-shaped channel to prevent movement of a series of shrimp thereon. The finger 36 is then moved up momentarily by pneumatic cylinder 35 to allow the passage thereby of a single shrimp S. This shrimp then moves to the second stopping station 31 where it abuts second stopping station finger 39 extending into the V-shaped channel. Plate 40 extends across the top of the V-shaped channel to prevent the shrimp from naturally curling while it contacts finger 39. Finger 39 is then pivoted, after a selected period of time to allow the shrimp of each pair of rails to reach their corresponding second stopping stations, to allow the passage of the shrimp to the third stopping station. The position and movement of the shrimp of each rail is now coordinated so that they simultaneously reach the third stopping station, wherein finger 45 is moved downward to hold the shrimp of each bottom track rail directly behind the head H and against the bottom track with the tip T of the shrimp abutting the stop bar of the deheading station.

Once the shrimp is positioned at the deheading station the severing fingers 55 are moved together by actuation of pneumatic cylinder 58, thus causing the vertical blades 62 to sever the shrimp head H and the horizontal blades 63 and 64 to enter the shrimp head along the connection of the pleopod section P. The severing fingers and stop bar are then pivoted to their releasing position by actuation of pneumatic cylinder 61, thereby pulling off and removing the head H from the body B of the shrimp. It should be understood that this exact positioning of the shrimp allows the blades to be positioned precisely along the sides of the head H so as to sever the head H along a plane PL extending through the head H in advance of the shrimp extra body meat EM extending beneath the head plate HP. Hence, the extra body meat EM is severed from the head H and extracted from beneath the head plate HP as a continuation of the body B. A stream of fluid is directed by nozzles 66 to wash the severed head from the severing fingers and into an unshown collection trough.

The contact position of the vertical blades 62 against the shrimp may be adjusted to accommodate shrimp of different size groups. This is done by simply moving the stop bar to different distances relative to the severing fingers. For example, for large shrimp the stop bar is moved distally from the severing fingers, while with small shrimp the stop bar is positioned close to the severing fingers. Also, the contact position of the horizontal blades 63 and 64 may be adjusted in the vertical direction.

It should be understood that the term "trough" as used herein is not limited to a structure having a bottom.

It thus is seen that an apparatus is now provided for orienting and deheading shrimp on an automated basis which overcomes problems long associated with those of the prior art. It should however be understood that the just described embodiment merely illustrates principles of the invention in its preferred form. Many modifications, additions and deletions may, of course, be made thereto without departure from the spirit and scope of the invention as set forth in the following claims.

I claim:

1. Apparatus for reorienting shrimp having a head, a tail, a body extending between the head and the tail, an anterior side, and a dorsal side, which enter the apparatus in a tail forward orientation to a head forward orientation and maintaining the orientation of shrimp entering the apparatus in a head forward direction, said apparatus comprising:

a trough having two opposite, inwardly facing shrimp supporting surfaces sloping downwardly towards each other, said two supporting surfaces having a first longitudinal portion spaced a selected distance from each other to support the heads and a majority of the bodies of shrimp thereon, a second longitudinal portion spaced a second selected distance from each other greater than said first selected distance between said first longitudinal portions to allow the passage of shrimp tails therebetween while supporting the shrimp heads thereon, said first and second portions being joined together at a junction defined by a bottom edge extending generally lateral to said longitudinal first and second portions, and a third longitudinal portion spaced a third selected distance from each other greater than said second selected distance between said second longitudinal portions and having an open bottom to allow the passage of the shrimp therebetween;

reciprocating means for reciprocating said trough in a longitudinal direction to cause movement of shrimp along said trough in the longitudinal direction, means for catching and advancing shrimp in a head forward orientation mounted directly below said third longitudinal portion;

whereby as shrimp positioned upon the trough with their tails forward in the direction of shrimp movement towards the junction bottom edge and the dorsal side of the shrimp facing downwards move onto the second portion their tails drop below the second portion with their heads still supported upon the first portion, thereby rotating the shrimp to a generally head forward position upon the second portion so as to substantially reverse the orientation of the shrimp, and upon further movement the shrimp onto the third portion the shrimp fall from the trough onto the catching and advancing means.

2. The apparatus of claim 1 wherein means for catching and advancing is a second trough coupled to said reciprocating means.

3. The apparatus of claim 1 wherein said first and second portions of said tough diverge from each other in the direction of shrimp movement along said trough.

4. The apparatus of claim 2 further comprising a third trough aligned generally longitudinally with said second trough and having a entry end spaced from an exit end of said second trough to form a gap therebetween, and wherein said reciprocating means also reciprocates said third trough, whereby with a shrimp positioned upon the second trough in an orientation with its tail forward in the direction of shrimp movement towards the gap and its dorsal side facing upwards, the forward movement of the shrimp over said gap causes the shrimp tail to drop into said gap thereby causing the shrimp to fall between the second trough and the third trough and with a shrimp positioned upon the second trough in an orientation with their heads forward, the shrimp heads bridge the gap causing the shrimp to continue onto said third trough.

5. The apparatus of claim 4 wherein said third trough has a floor therebetween at least partially supporting a shrimp thereon.

6. The apparatus of claim 3 further comprising a fourth trough mounted below said gap and generally in the same longitudinal direction as said second trough to capture shrimp falling from said gap.

7. The apparatus of claim 5 further comprising first stop means associated with said third trough for stopping the forward movement of a series of shrimp positioned upon said third trough and sequentially allowing the passage of a single shrimp along said third trough.

8. The apparatus of claim 7 further comprising second stop means associated with said third trough positioned downstream of said first stop means for stopping the forward progress of shrimp along said third trough and sequentially releasing the shrimp for forward movement along said third trough.

9. The apparatus of claim 8 further comprising holding means for releasably holding shrimp adjacent a exit end of said third trough.

10. The apparatus of claim 9 further comprising a stop plate mounted adjacent said third trough exit end positioned to be abutted by shrimp positioned upon said third trough and held by said holding means, and severing means for severing the heads of shrimp abutting said stop plate.

11. The apparatus of claim 10 wherein said severing means comprises a pair of reciprocating severing blades actuatable to engage opposite sides surfaces of shrimp heads therebetween and sever the shrimp heads along a plane oriented laterally across the shrimp from the anterior of the shrimp heads to the posterior of the shrimp heads.

12. The apparatus of claim 11 wherein said severing means further comprises a pair of second blades mounted generally normal to said severing blades positioned to sever and separate the pleopod of shrimp from the heads of shrimp with the shrimp oriented with the dorsal side facing upward.

13. The apparatus of claim 12 wherein said severing means further comprises a pair of third blades mounted generally normal to said severing blades positioned to sever and separate the pleopod of shrimp from the heads of shrimp with the shrimp oriented with the dorsal side facing downward.

14. The apparatus of claim 10 further comprising moving means coupled to said severing means for moving said severing means away from said third trough to further separate the shrimp heads from the shrimp bodies.

15. Apparatus for reorienting shrimp having a head, a tail, a body extending between the head and the tail, an anterior side, and a dorsal side, which enter the apparatus in a tail forward orientation to a head forward orientation and maintaining the orientation of shrimp entering the apparatus in a head forward direction, said apparatus comprising:

a first trough having two opposite, inwardly facing shrimp supporting surfaces sloping downwardly towards each other, said two supporting surfaces having a first longitudinal portion spaced a selected distance from each other along a first longitudinal lower edge so as to support the heads and at least a majority of the bodies of shrimp thereon, a second longitudinal portion spaced a second selected distance from each other along a second longitudinal lower edge greater than said first selected distance between said first longitudinal portions and elevated above said first longitudinal lower edge so as to allow the passage of shrimp tails therebetween and maintain the support of the heads of the shrimp thereon, said first and second lower edges being joined by a generally lateral, transverse lower edge, and a third longitudinal portion spaced a third selected distance from each other along a third longitudinal lower edge greater than said second selected distance between said second longitudinal portions and having an open bottom to allow the passage of the shrimp therebetween;

a second trough mounted directly below said third longitudinal portion; and reciprocating means for reciprocating said first and second troughs in a longitudinal direction to cause movement of shrimp along said first and second troughs in the longitudinal direction, whereby as shrimp positioned upon the first trough within the first portion of the channel with their tails forward in the direction of shrimp movement towards the second portion and the dorsal side of the shrimp facing downwards move into the second portion of the channel their tails drop substantially below the first trough while their heads are still supported upon the supporting surfaces, thereby rotating the shrimp to a generally head forward position upon the second portion so as to substantially reverse the orientation of the shrimp, and upon further movement the shrimp onto the third portion the shrimp fall through the third longitudinal portion of the channel onto the catching means.

16. The apparatus of claim 15 wherein said first and second portions of said tough diverge from each other in the direction of shrimp movement along said trough.

17. The apparatus of claim 15 further comprising a third trough aligned generally longitudinally with said second trough and having a entry end spaced from an exit end of said second trough to form a gap therebetween, and wherein said reciprocating means also reciprocates said third trough, whereby with a shrimp positioned upon the second trough with its tail forward in the direction of shrimp movement towards the gap and its dorsal side facing upwards, the forward movement of the shrimp over the gap causes the shrimp tail to drop into the gap causing the shrimp to fall between the second trough and the third trough and with a shrimp positioned upon the second trough in an orientation with their heads forward the shrimp heads bridge the gap causing the shrimp to continue onto the third trough.

18. The apparatus of claim 17 further comprising a fourth trough mounted below said gap and generally in the same longitudinal direction as said second trough to capture shrimp falling from said gap.

19. The apparatus of claim 17 further comprising first stop means associated with said third trough for stopping the forward movement of a series of shrimp positioned upon said third trough and sequentially allowing the passage of a single shrimp along said third trough.

20. The apparatus of claim 19 further comprising second stop means associated with said third trough positioned downstream of said first stop means for stopping the forward progress of shrimp along said third trough and sequentially releasing the shrimp for forward movement along said third trough.

21. The apparatus of claim 20 further comprising holding means for releasably holding shrimp adjacent an exit end of said third trough, a stop plate mounted adjacent said third trough exit end positioned to be abutted by shrimp positioned upon said third trough and held by said holding means, and severing means for severing the heads of shrimp abutting said stop plate.

22. The apparatus of claim 21 wherein said severing means comprises a pair of reciprocating severing blades actuatable to engage opposite sides surfaces of shrimp heads therebetween and sever the shrimp heads along a plane oriented laterally across the shrimp from the anterior of the shrimp heads to the posterior of the shrimp heads.

23. The apparatus of claim 22 wherein said severing means further comprises a pair of second blades mounted generally normal to said severing blades positioned to sever and separate the pleopod of shrimp from the heads of shrimp.

24. The apparatus of claim 21 further comprising moving means coupled to said severing means for moving said severing means away from said third trough to further separate the shrimp heads from the shrimp bodies.

* * * * *